United States Patent [19]

Genut et al.

[11] Patent Number: 6,123,803
[45] Date of Patent: Sep. 26, 2000

[54] LASER PROCESSING CHAMBER WITH CASSETTE CELL

[75] Inventors: Menachem Genut, Haifa; Boris Livshit (Buyaner), Carmiel; Ofer Tehar-Zahav, Natania, all of Israel

[73] Assignee: Oramir Semiconductor Equipment Ltd., Haifa, Israel

[21] Appl. No.: 09/068,058

[22] PCT Filed: Nov. 4, 1996

[86] PCT No.: PCT/IL96/00141

§ 371 Date: Apr. 28, 1998

§ 102(e) Date: Apr. 28, 1998

[87] PCT Pub. No.: WO97/17167

PCT Pub. Date: May 15, 1997

[30] Foreign Application Priority Data

Nov. 9, 1995 [IL] Israel ........................................ 115934

[51] Int. Cl.[7] ...................................................... C23F 1/02
[52] U.S. Cl. ........................... 156/345; 134/1.3; 438/795; 219/121.86
[58] Field of Search .............................. 156/345; 134/1.3; 438/690, 795; 219/121.6, 121.68, 121.86; 118/723

[56] References Cited

U.S. PATENT DOCUMENTS 4,752,668  6/1988  Rosenfield et al. .
5,024,968  6/1991  Engelsberg .
5,099,557  3/1992  Engelsberg .
5,114,834  5/1992  Nachshon .

FOREIGN PATENT DOCUMENTS

| 350021 | 5/1993 | European Pat. Off. . |
| 661110 | 7/1995 | European Pat. Off. . |
| 62-276828 | 10/1987 | Japan . |
| 1018226 | 1/1989 | Japan . |
| 2165616 | 6/1990 | Japan . |
| WO 93/19888 | 10/1993 | WIPO . |
| WO 94/23854 | 10/1994 | WIPO . |
| WO 95/07152 | 3/1995 | WIPO . |
| WO 96/09128 | 3/1996 | WIPO . |

*Primary Examiner*—Richard Bueker
*Assistant Examiner*—Alva C. Powell
*Attorney, Agent, or Firm*—Cowan, Liebowitz & Latman, P.C.; William H. Dippert

[57] ABSTRACT

A process chamber for carrying out laser treatments, on the surface of an object, comprising: a base provided with object support means; a cover provided with a window substantially transmissive of laser light; gas inlet and gas outlet means; the said cover and the said base, when connected, leaving a space between the surface of the element and the inner surface of the window, in which gases flowing through the said gas inlet may flow above the surface of the object being treated and out of the process chamber through the said gas outlet.

10 Claims, 5 Drawing Sheets

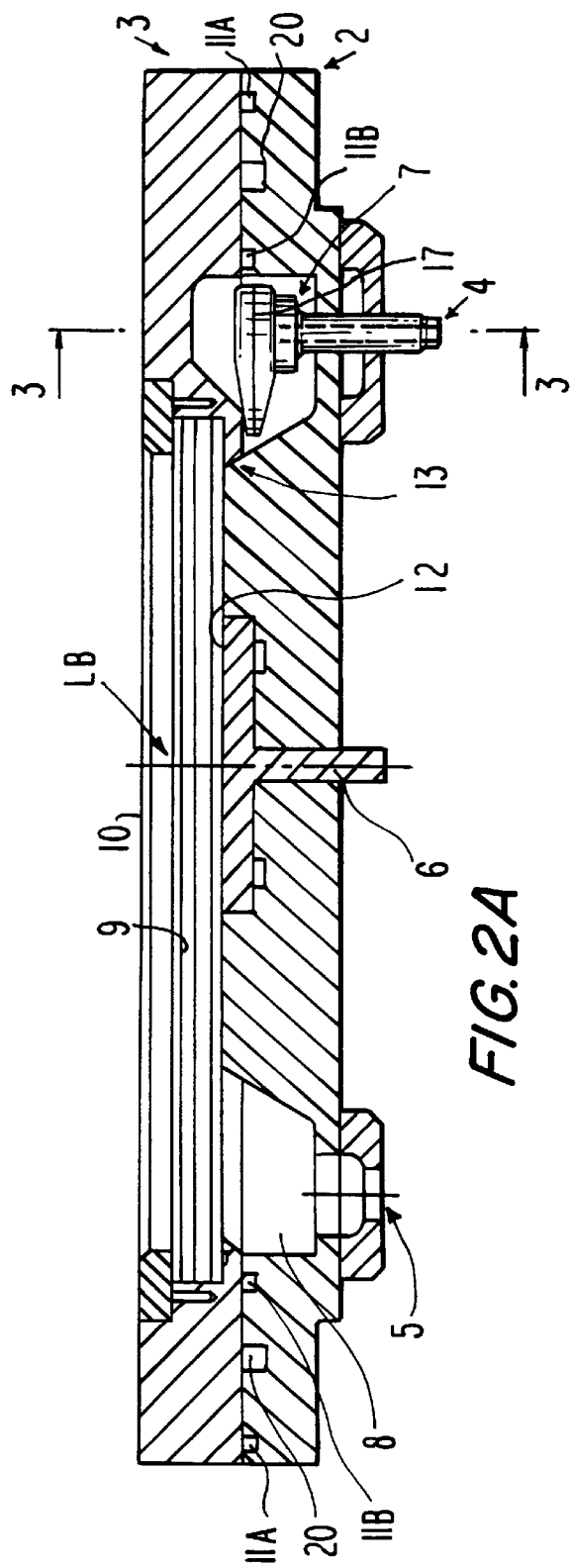
*FIG.2A*
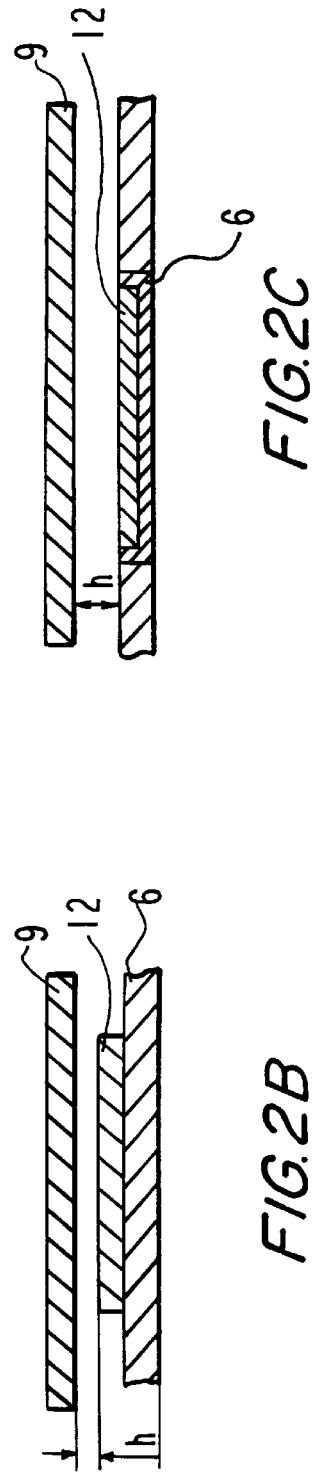
*FIG.2B*
*FIG.2C*

LASER PROCESSING CHAMBER WITH CASSETTE CELL

FIELD OF THE INVENTION

The present invention relates to U.V. laser surface treatment methods, particularly to the removal of foreign materials from substrate surfaces. More particularly, the invention relates to a process chamber for the aforesaid purposes, which provides effective dry laser stripping and cleaning.

BACKGROUND OF THE INVENTION

In the manufacturing of various products it is necessary to apply a layer of protective material on a surface, which must be removed after a specified manufacturing step has been concluded. An example of such process is the so-called "masking", where a pattern is created on a surface using a layer of protective material illuminated through a mask, and the surface is then treated with a developer which removes material from the unmasked portions of the surface, therefore leaving a predetermined pattern. The surface is then treated by ion implantation or by etching agents, which introduce the implanted species into the unmasked portions of the surface, or removes material from unmasked portions. Once these processes are completed, the role of the protecting mask ends and it must be removed. The process is conventional and well known in the art, and is described, e.g., in U.S. Pat. No. 5,114,834.

Two main photoresist stripping methods exist in the modern VLSI/ULSI (Very/Ultra Large Scale Integration) circuits industry:

1) Wet stripping which uses acids or organic solvents;
2) Dry stripping, which uses plasma, $O_3$, $O_3/N_2O$ or U.V./$O_3$-based stripping.

Both methods are problematic and far from being complete, especially when taking into consideration the future miniaturization in the VLSI/ULSI industry. The current technology is capable of dealing with devices having feature sizes of about 0.5 $\mu$m, but before the end of the century the expectation is that the workable size of the devices is expected to be reduced to 0.25 $\mu$m. The expected size changes require considerable changes in the manufacturing technology, particularly in the stripping stage. The prior art photoresist stripping techniques described above will be unsuitable for future devices, as explained hereinafter.

Utilizing only the wet stripping method is not a perfect solution, as it cannot completely strip photoresist after tough processes that change the chemical and physical properties of the photoresist in a way that it makes its removal very difficult. Such processes include, e.g.,. High Dose Implantation (HDI), reactive Ion Etching (RIE), deep U.V. curing and high temperatures post-bake. After HDI or RIE the side walls of the implanted patterns or of the etched walls are the most difficult to remove.

In addition, the wet method has some other problems: the strength of stripping solution changes with time, the accumulated contamination in solution can be a source of particles which adversely affect the performance of the wafer, the corrosive and toxic content of stripping chemicals imposes high handling and disposal costs, and liquid phase surface tension and mass transport tend to make photoresist removal uneven and difficult.

The dry method also suffers from some major drawbacks, especially from metallic and particulate contamination, damage due to plasma: charges, currents, electric fields and plasma-induced U.V. radiation, as well as temperature-induced damage, and, especially, incomplete removal. During various fabrication stages, as discussed above, the photoresist suffers from chemical and physical changes which harden it, and this makes the stripping processes of the prior art extremely difficult to carry out. Usually a plurality of sequential steps, involving wet and dry processes are needed to remove completely the photoresist.

The art has addressed this problem in many ways, and commercial photoresist dry removal apparatus is available, which uses different technologies. For instance, UV ashers are sold, e.g. by Hitachi, Japan (UA-3150A), dry chemical ashers are also available, e.g., by Fusion Semiconductor Systems, U.S.A., which utilize nitrous oxide and ozone to remove the photoresist by chemical ashing, microwave plasma ashing is also effected, e.g., as in the UNA-200 Asher (ULVAC Japan Ltd.). Also plasma photoresist removal is employed and is commercially available, e.g., as in the Aspen apparatus (Mattson Technology, U.S.A.), and in the AURA 200 (GASONICS IPC, U.S.A.).

More recently, photoresist removal has been achieved by ablation, using laser UV radiation, in an oxidizing environment, as described in U.S. Pat. No. 5,114,834. The ablation process is caused by strong absorption of the laser pulse energy by the photoresist. The process is a localized ejection of the photoresist layer to the ambient gas, associated with a blast wave due to chemical bonds breaking in the photoresist and instant heating. The partly gasified and partly fragmented photoresist is blown upwards away from the surface, and instantly heats the ambient gas. Fast combustion of the ablation products occurs, due to the blast wave and may also be due to the photochemical reaction of the UV laser radiation and the process gases. The main essence of the process is laser ablation with combustion of the ablated photoresist which occurs in a reactive gas flowing through an irradiation zone. The combination of laser radiation and fast combustion provides instantaneous lowering of the ablation threshold of hard parts of the photoresist (side walls). The combusted ablation products are then removed by vacuum suction, or by gas sweeping leaving a completely clean surface.

The aforementioned patent U.S. Pat. No. 5,114,834 does not describe any particular requirements for the ablation cell, which is referred to as a "container" or a "process chamber". However, it has been found that the structure of the process chamber has a critical effect on the quality of the stripping process.

While reference will be made throughout this specification to the ablation of photoresist from semiconductor wafers, this will be done for the sake of simplicity, and because it represents a well known and widely approached problem. It should be understood, however, that the invention described hereinafter is by no means limited to the stripping of photoresist from wafers, but it applies, *mutatis mutandis*, to many other applications, such as stripping and cleaning of photoresist from Flat Panel Displays (FPD) or removal of residues from different objects, such as lenses, semiconductor wafers, or photo-masks.

SUMMARY OF THE INVENTION

It has now been found, and this is an object of the invention, that not every dimension and configuration of the process chamber for carrying out pulsed U.V.-laser ablation/etching of foreign materials from substrate surface in ambient reactive gases, provides goods results and that in order to obtain satisfactory results there are certain dimensional constraints to be observed. These constraints are important as they provide conditions of reactive gas decomposition and excitation for stripping and fast enhanced combustion of the ablation products.

The invention provides a stripping apparatus employing a process chamber where the laser ablation/etching takes place in a cassette cell configuration in ambient reactive gases, which can be used for the effective stripping or removal of coatings, such as photoresist, to yield a cleaned product of high quality.

DETAILED DESCRIPTION OF THE INVENTION

The process chamber for carrying out pulsed U.V.-laser ablation processes on the surface of an object in ambient reactive gases, according to the invention, comprises:

a base provided with object support means;

a cover provided with a window substantially transmissive of laser light;

reactive gas inlet and reactive gas outlet means; the said cover and the said base, when connected, leaving a space between the surface of the element and the inner surface of the window, in which gases flowing through the said gas inlet may flow above the surface of the object being treated and out of the cell through the said gas outlet.

In order to obtain optimal results, fast ignition and combustion of ablation products are needed. This is needed in order to achieve maximal and complete burning, volatilization and removal of such products during the short interval between laser pulses (about $10^{-2}$ s). According to a preferred embodiment of the invention, this is achieved by providing a cell in which the product of the total pressure in the cell, (P) and of the distance (h) between the surface of the object to be treated and the inner surface of the window (hereinafter referred to as "gap" (h)), is approximately constant. This means maintaining the same amount of oxidizer needed for combustion as required by the stoichiometry. Mathematically, it can be expressed as P·h=K. K is constant for a given set up of ablation parameters as laser fluence energy at a given wavelength. A typical range of K is 40–60 Pa·m or N·m$^{-1}$ with an average value of 50 Pa·m.

For a typical working pressure of 250 mbar or $2·5\times10^4$ Pa, the gap h can be calculated as h=k/P=50/2.5×10$^4$=2×10$^{-3}$ m=2 mm.

A variety of construction materials can be employed in the construction of the process chamber of the invention. According to one preferred embodiment of the invention, the window is made of fused silica, quartz, MgF$_2$, CaF$_2$ and sapphire, or the like material. According to another preferred embodiment of the invention, the base and the cover of the cell are made of a material selected from among quartz, stainless steel (e.g., 316 L), and aluminum, preferably "hard-anodized", or from ceramic materials, e.g. alumina.

Pressurization of the cell can be obtained by any suitable means known in the art, e.g., by means of sealing rings, such as O-rings.

The above and other characteristics and advantages of the invention will be better understood through the following illustrative and non-limitative description of preferred embodiments.

BRIEF DESCRIPTION OF THE DRAWINGS

In the drawings:

FIG. 2A is a cross-sectional view of the chamber of FIG. 1, taken along the 2—2 plane and FIGS. 2B and 2C are details of FIG. 2A;

DETAILED DESCRIPTION OF THE DRAWINGS

Figure 1:
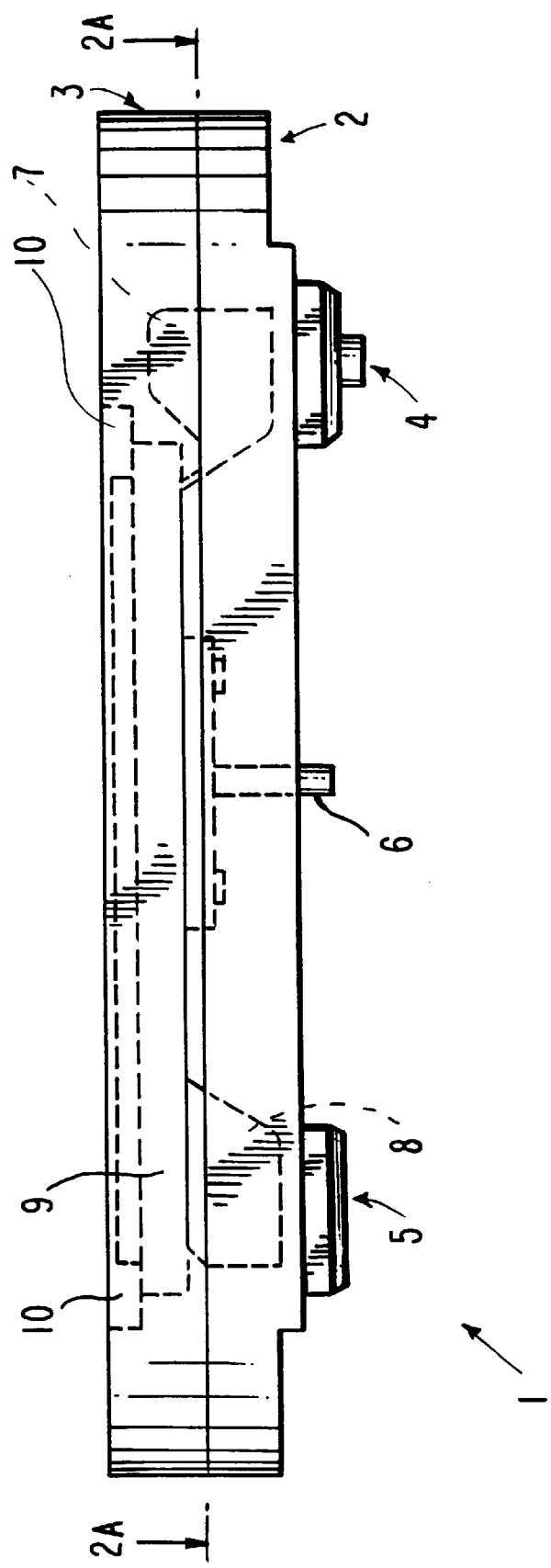
FIG. 1 is a general side view of a process chamber according to one preferred embodiment of the invention, some internal functional elements being outlined in broken lines.

Looking now at FIG. 1, numeral 1 generally indicates a process chamber consisting of a base 2, and a cover 3, which are connected by air-tight connections (not shown), so that the inner part of the process chamber defined by the said base 2 and cover 3 can be kept under pressure or vacuum. The base 2 is provided with N$_x$O$_y$ gas inlet 4, and O$_2$/O$_3$ inlet (shown in FIG. 3), which will be further described below, and gas outlet 5, for exhausting gases which have passed through the irradiated zone. The base 2 is further provided with a chuck 6, on which the element to be stripped, e.g., a wafer, is supported. Through the center of chuck 6 vacuum is applied, to hold the wafer in place during the process.

Looking now at the parts shown in broken lines, the inlet gas and stagnation cell 7 is seen, for the introduction and mixing of inflowing gases, as well as the exhaust assembly 8. A fused silica window 9 is provided above the element to be stripped, e.g., a silicon wafer, to which reference will be made in the following description for the sake of simplicity. This window permits the passage of the laser beam which originates from a source positioned above the chamber 1. A cover frame 10 keeps the silica windows in place, and assists in keeping the chamber pressurized or under vacuum.

FIGS. 2A–2C show in greater details and in cross-section, some of the elements of the process chamber of FIG. 1. Two seals, 11A and 11B are shown in this cross-section, which may be, e.g., O-rings. These two seals define two vacuum zones in the process chamber:

a) Zone 1, which defines the ablation environment in the irradiation zone. The pressure is maintained by means of throttle valve connected in a closed loop to a pressure controller. Typical pressure is in the range of 50–2000 mbar. this pressure regime is defined by seal 11B.

b) Zone 2, which defines the pressure in the outside vacuum channel 20 in between seals 11A and 11B.

The pressure in the channel is always much lower than in the process chamber and usually is in the order of a few millibars or typical vacuum obtainable from mechanical vacuum pumps.

The outer vacuum channel 20 has two main purposes:

1. To maintain firmly cover 3 through the aid of the atmospheric pressure.

2. For safety purposes, to avoid the possibility of leaking of hazardous process gases through seal 11B. Here, in case of a leak, the gas will be sucked by the vacuum pump connected to channel 20.

The wafer is positioned above chuck 6 and below window 9, as indicated by numeral 12. Wafer 12 can be positioned on chuck 6 in two ways, as shown in FIGS. 2B and 2C. In FIG. 2B the wafer is on top of chuck 6. In FIG. 2C the wafer is immersed inside chuck 6. As stated, the wafer does not touch window 9, and there is a distance between them which is preferably kept in the range of 0.2–10 mm. As explained, this distance can be varied as long as the product of the values of P×h remains approximately constant, wherein P is the pressure above the wafer and h is the gap, as hereinbefore defined. The pressure referred to above is measured in the center of the process chamber in the irradiation zone.

The space between the window and the wafer defines the ablation cassette cell, through which the gases flow, and in which the ablation products are jetted from the wafer, ignited and combusted. Looking at gas inlet stagnation cell 7, it can be seen that the inflowing gases flow into the ablation cell through a communication opening indicated by numeral 13.

The window above the wafer is made of fused silica, because it must fulfill certain requirements such as optical quality, to permit maximum passage of the incident laser beam (indicated in the figure by the LB arrow), durability, resistance to process gases and temperature, mechanical strength, etc. However, it is clear that alternative materials can be used, as long as they meet the desired operational conditions.

Figure 3:
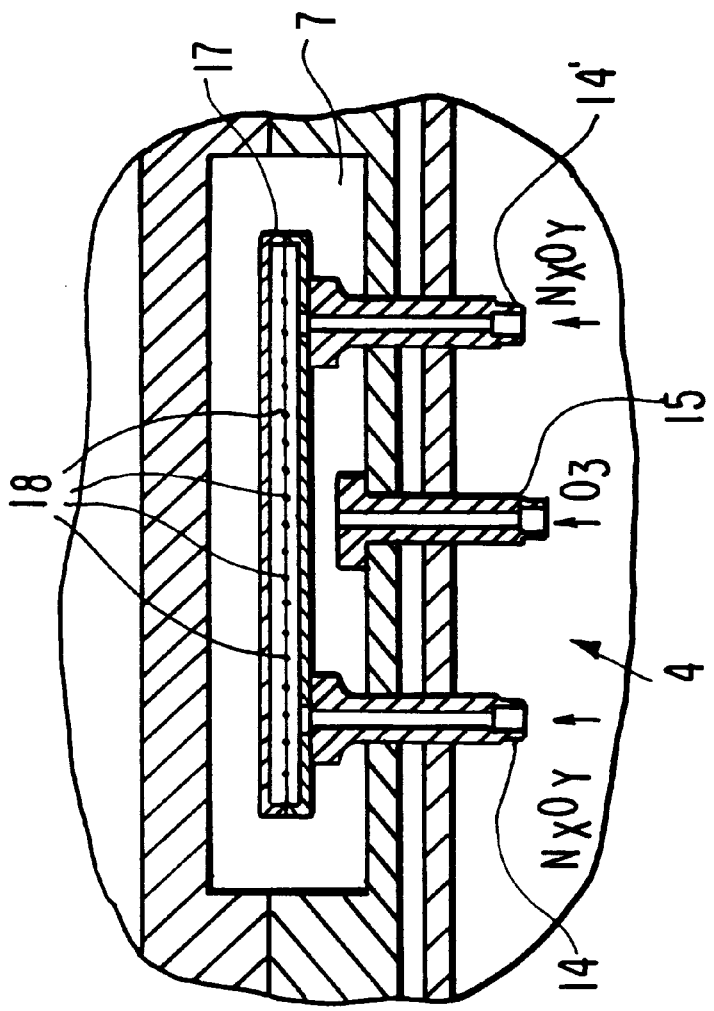
FIG. 3 is an enlarged cross-section of the gas inlet assembly, taken along the 3—3 plane of FIG. 2.

FIG. 3 shows the gas inlet stagnation cell, according to one embodiment of the invention. The stagnation cell is shown in enlarged partial cross-section, taken along the C—C plane of FIG. 2. The stagnation cell comprises gas inlet 4. consisting of three separate inlets, two inlets 14 and 14', for $N_xO_y$ gas, and one inlet 15, for $O_2/O_3$ gas. The gas generator, as well as the $O_3$ or $N_xO_y$ generator, if any, are located near the process chamber. As it can be seen from the figures, the gases enter separately into the process chamber and are mixed only while the $O_{2+}O_3$ gas passes the outlet of the $N_xO_y$ nozzle 17. The $N_xO_y$ is introduced through small holes 18.

Figure 4:
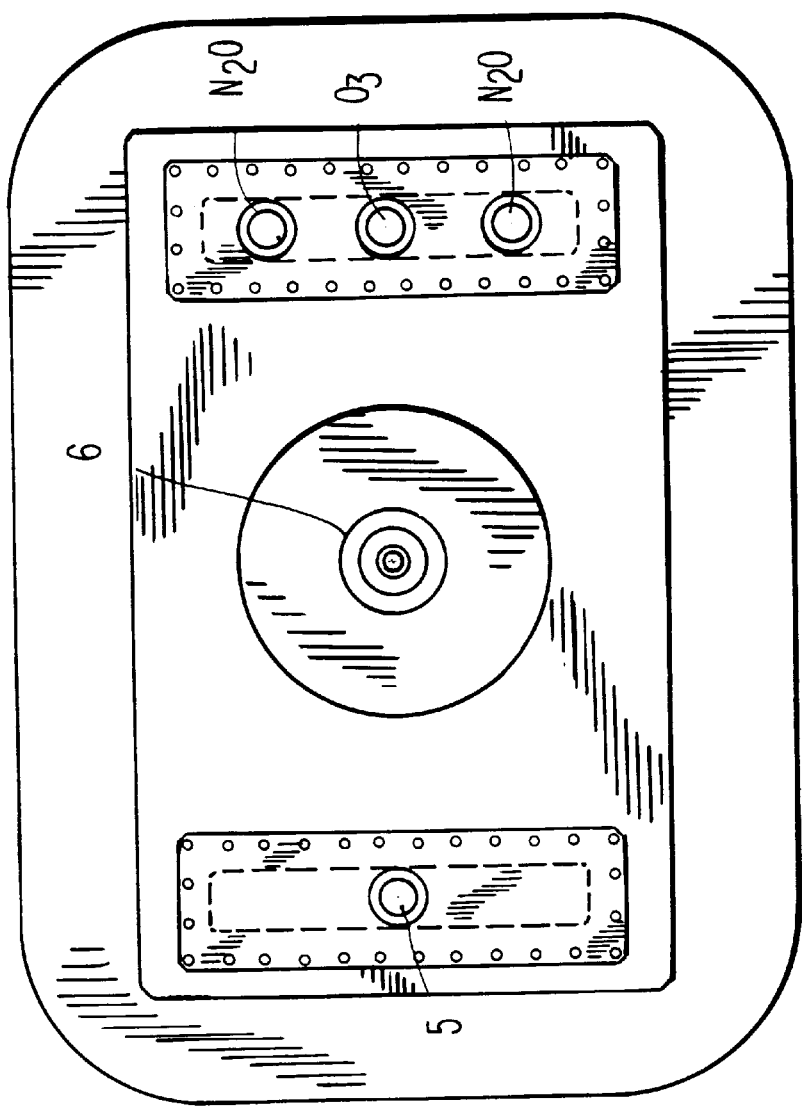
FIG. 4 is a bottom view of the process chamber of FIG. 1.

FIG. 4 shows the bottom of the process chamber of FIG. 1, from which the bottom of the chuck 6 can be seen, as well as the exhaust 5 and inlets 14, 14' and 15 of the gas inlet assembly. It should be noted that two inlets are provided in this embodiment for $N_xO_y$, while only one inlet is provided for $O_3$. However, different gas inlets can of course be used, as long as the gases are introduced separately, without exceeding the scope of the invention.

Figure 5:
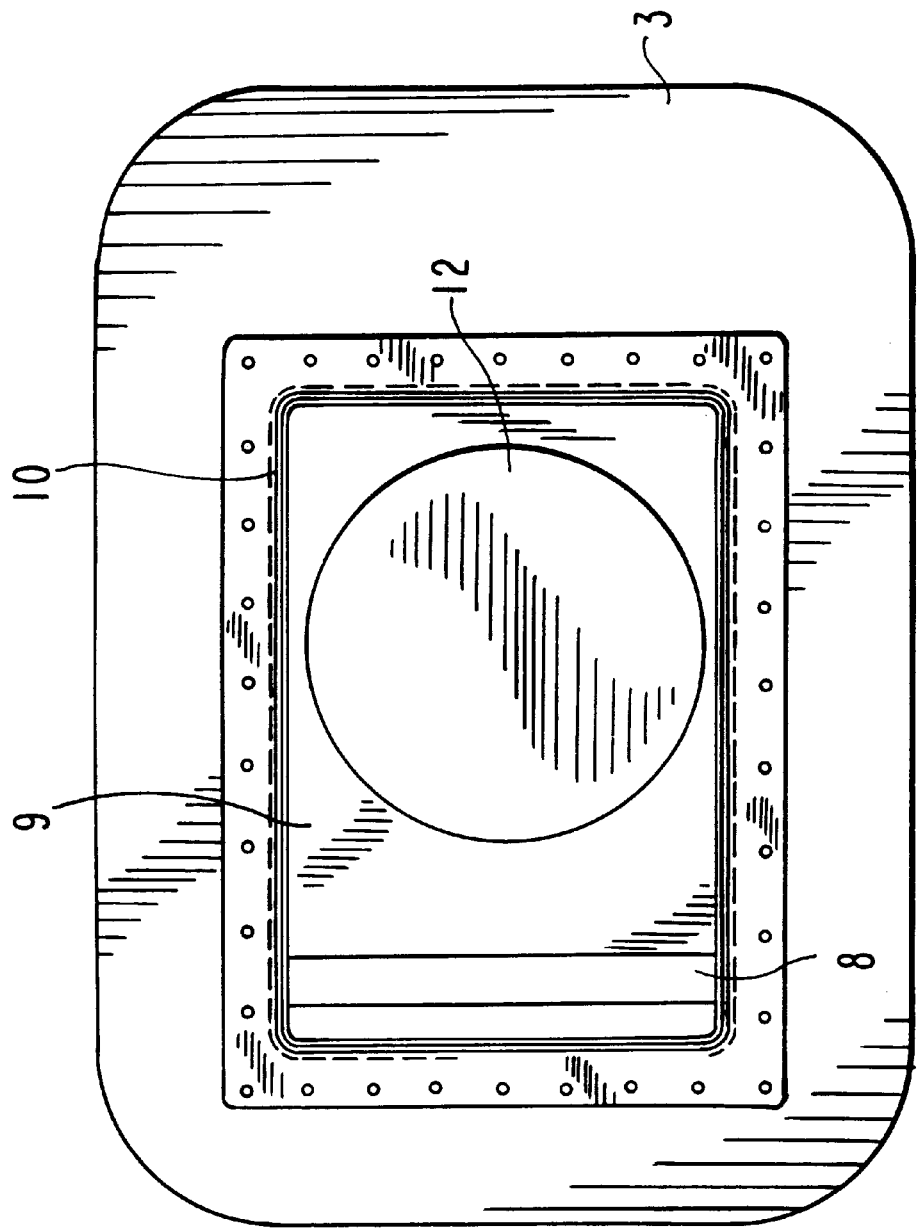
FIG. 5 is a top view of the process chamber of FIG. 1.

FIG. 5 shows a top view of the process chamber of FIG. 1, from which the wafer 12 can be seen below the window 9. According to the particular embodiment of FIG. 5, the wafer and the cover frame are positioned asymmetrically with respect to the cover. This is done in order to permit a laser cleaning while scanning of the outlet channel 8 where some ablation residues may accumulate.

It should be understood that the process chamber of the invention is not limited to be used in any particular apparatus, and it can be used in ablation stripping and cleaning to be hereinafter mentioned as laser treatment processes in any suitable system. For instance, the process chamber can be kept stationary while the laser beam scans the wafer, or the laser beam can be fixed and the process chamber can move by means of a suitable X-Y system. Additionally, the invention is not limited to any particular shape or size of process chamber, and can be used to perform laser treatment processes on much larger or much smaller surfaces, can be of different shapes, and can employ different construction materials. Furthermore, the cell can be utilized for processes employing a variety of gases, and is by no means limited to the use with the gases exemplified in the above illustrative and non-limitative description of preferred embodiments.

One version of the process chamber can be utilized for special purposes, where the wafer or object to be cleaned or stripped is maintained at an elevated temperature to assist and enhance the chemical process. Typical temperatures can be between 75–350° C. The heat source can be outside the chamber, and heat may be provided, e.g., by radiation, or it may be inside and heat may be provided by conduction. In some applications it is also possible to introduce the gases at elevated temperature, to maintain the desired temperature in time. It is also possible to heat the outlet channel 8 to temperatures between 150–350° C., to assist the combustion of the accumulating ablation products by reactive process gases.

What is claimed is:

1. A process chamber for carrying out laser ablation/etching as well as combustion and evacuation of foreign materials from substrate surfaces, in ambient gas flow of two reactive gas components, which comprises:
   (a) a base provided with object support means;
   (b) a cover provided with a window substantially transmissive of laser light;
   (c) an irradiation zone;
   (d) a stagnation chamber;
   (e) separate inlets into said stagnation chamber for said two components of the reactive gas;
   (f) a reactive gas outlet;
   (g) an outside vacuum channel;
   (h) a first seal defining a first vacuum zone in the process chamber; and
   (i) a second seal defining with said first seal a second vacuum zone defining the pressure in said outside vacuum channel.

2. A chamber according to claim 1, associated with means for maintaining in said second zone a pressure lower than in said first zone.

3. A chamber according to claim 1, associated with the said outside vacuum channel, for avoiding the damage of leaking the hazardous reactive process gases to the said outside working environment.

4. A chamber according to claim 1, having structural features and dimensions adapted for laser ablation, etching, cleaning and other laser surface treatments in ambient reactive gas including fast combustion and fast gas flow.

5. A chamber according to claim 1, wherein the product of the pressure (P) and of the distance (h) between the surface of the object to be treated and the inner surface of the window is in the range of 40–60 Pa·m.

6. A chamber according to any one of claims 1 to 3, wherein the distance between the surface of the object to be treated and the inner surface of the window is in the range 0.2–10 mm.

7. A chamber according to claim 1, wherein the distance between the surface of the object to be treated and the inner surface of the window is about 2 mm.

8. A chamber according to claim 1, wherein the window is made of a material chosen from among silica quartz, MgF, CaF and sapphire.

9. A chamber according to claim 1 or 2, wherein the base and the cover of the chamber are made of a material selected from among quartz, stainless steel, aluminum or ceramic materials.

10. A chamber according to claim 1, wherein pressurization is obtained by means of sealing rings.

* * * * *